US005729097A

United States Patent [19]

Holzer

[11] Patent Number: 5,729,097

[45] Date of Patent: Mar. 17, 1998

[54] METHOD AND DEVICE FOR CONTROLLING ELECTRIC DISCHARGE LAMPS WITH ELECTRONIC FLUORESCENT LAMP BALLASTS

[76] Inventor: Walter Holzer, 7758 Meersburg, Germany

[21] Appl. No.: 79,003

[22] Filed: Jun. 17, 1993

Related U.S. Application Data

[63] Continuation-in-part of Ser. No. 800,497, Nov. 29, 1991, abandoned.

[30] Foreign Application Priority Data

Nov. 29, 1990 [DE] Germany .......................... 40 37 948.5

[51] Int. Cl.[6] .......................... H02B 37/02

[52] U.S. Cl. .......................... 315/307; 315/DIG. 4; 315/DIG. 5; 315/362

[58] Field of Search .......................... 315/291, 362, 315/313, 307, DIG. 4, DIG. 5, 360, 284

[56] References Cited

U.S. PATENT DOCUMENTS

| | | | |
|---|---|---|---|
| 3,943,375 | 3/1976 | Williamson | 315/360 |
| 4,189,664 | 2/1980 | Hirschfeld | 315/307 |
| 4,350,934 | 9/1982 | Spreadbury | 315/284 |
| 4,431,948 | 2/1984 | Elder | 315/291 |
| 4,443,740 | 4/1984 | Goralnik | 315/DIG. 4 |
| 4,562,384 | 12/1985 | Owen | 315/284 |
| 4,833,339 | 5/1989 | Luchaco | 315/DIG. 4 |
| 4,937,702 | 6/1990 | Kurihara | 315/DIG. 4 |
| 4,950,463 | 8/1990 | Sievers | 315/360 |

*Primary Examiner*—Robert Pascal
*Assistant Examiner*—Michael Shingleton
*Attorney, Agent, or Firm*—Baker & Daniels

[57] ABSTRACT

A method and device for controlling electric discharge lamps with electronic fluorescent lamp ballasts, using a bistable reverse switch system in the electric circuit in such manner that in turning the lamp on to a first switching condition, and after a short period of interruption of the electric circuit to the current supply of the lamp, the bistable reverse switch system acquires a second switching condition. It is thereby possible to reduce the lamp from a first level of brightness to a second lower level of brightness. It has the effect of a "dimmer" used with fluorescent lamps.

16 Claims, 3 Drawing Sheets

METHOD AND DEVICE FOR CONTROLLING ELECTRIC DISCHARGE LAMPS WITH ELECTRONIC FLUORESCENT LAMP BALLASTS

This is a continuation-in-part of my prior and application Ser. No. 07/800,497 filed Nov. 29, 1991 now abandoned.

BRIEF SUMMARY OF THE INVENTION

Electric discharge lamps with electronic fluorescent lamp ballasts in many cases are preferred over conventional incandescent lamps, because the former consume a small amount of current, relative to the latter, set at the same illumination level. For example, with fluorescent lamps one can achieve the same level of illumination with about 20 percent of the current consumed by incandescent lamps.

In many cases, so called "dimmers" are also used, in order to reduce the brightness of the lamps. Such dimmers are expensive, and necessitate an additional installation, especially when added to an already existing lighting system.

The present invention has an objective of facilitating a choice of a maximum, or a reduced, light level.

The device of the invention utilizes an electric circuit incorporating a bistable reverse switch system (flip-flop) which, when the lamp is switched on, is at a first switching condition and, after a short interruption of the electric circuit as achieved for instance by pressing a push button type circuit breaker switch, is at a second switching condition and by each further short interruption of the electric circuit, a change between the two switching conditions occurs. According to the invention both switching conditions correspond to different lamp currents and thereby different values of brightness.

With a longer interruption of the current as achieved by holding the push button type circuit breaker switch depressed for an extend length of time (say three seconds), for example longer than a second, the bistable switching system switches back to its initial state.

Such a flip-flop system provides a great advantage in that it can simply be placed in the electronic fluorescent lamp ballast.

Since greater brightness is normally desired in the switching on step, it is provided in the device of the invention that in switching on, the maximum current strength is always reached first, and a reduction is then produced after a short circuit interruption.

In order to provide reduced current strengths to accommodate different demands, the device of the present invention is provided with an operator's control, in the form of a dimmer, by means of which the desired reduced circuit strength can be set and accomplished.

For the purpose of conservation, the device is provided with a single bistable switching system for controlling several electronic fluorescent lamp ballasts in groups, and in the case of larger facilities, the reduced circuit strengths can be set individually, or in groups, by means of the operator's controls, or dimmers.

In order to avoid extinguishing of the lamps when switching to the second switching condition, it is further provided that a circuit breaker, for example in the form of a push button, be placed in the electric circuit. The circuit breaker quickly interrupts the electric circuit, as sensed by the bistable switching system, such that the lamp does not go out, but the bistable switching system responds to the interruption.

BRIEF DESCRIPTION OF THE SEVERAL VIEWS OF THE DRAWINGS

FIG. 1 shows one example in schematic presentation of a device made according to the invention.

Figure 2:
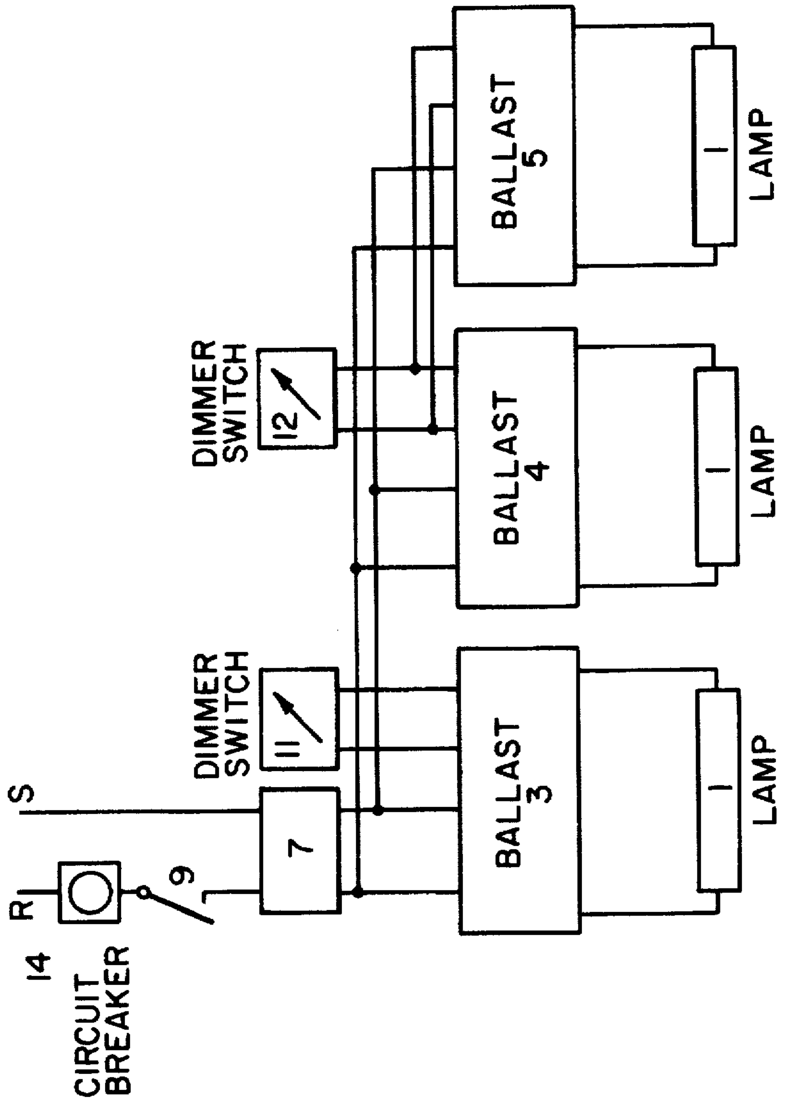
FIG. 2 is a further form of a device according to the invention, which includes a plurality of units in a group.

An electric discharge lamp 1 is connected by way of an electronic fluorescent lamp ballast 2 to an electrical source of current, including lines R, S. Connected across the lines R, S is the bistable switching system 6, which senses lines R, S for an interruption in power supply as initiated by circuit breaker 13. In the line R is a switch 8, by means of which the lamp 1 is switched on and off. In series with the switch 8, in the supply line R, is a circuit breaker 13 in the form of a push button. When this push button 13 is touched and activated, there occurs a current interruption in the region of milliseconds. This interruption is short enough to avoid a disturbing extinguishing of the lamp 1, but long enough to activate the bistable switching system 6.

Upon sensing the activation of the push button, the bistable system 6 senses the momentary current interruption and switches into its second switching position, and thereby by means of the electronic fluorescent lamp ballast 2 controls the lamp current through the lamp 1.

Operably connected with the ballast 2 is an operator's control 10 which is a dimmer switch. This dimmer switch may be set by the operator to provide a predetermined value of lamp current as desired.

Figure 1:
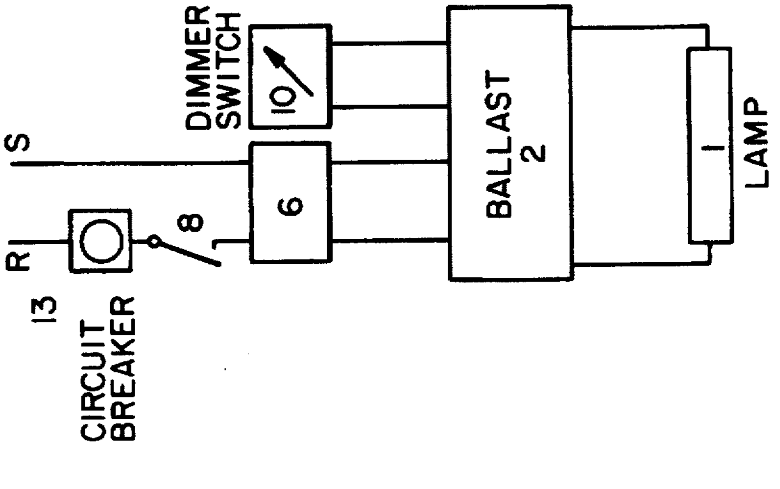
FIG. 1 is a schematic presentation of the device according to the invention.

FIG. 2 shows an arrangement including a plurality of units essentially identical with that of FIG. 1. The group of FIG., 2 includes three lamps 1, which are controlled respectively from the electronic fluorescent lamp ballasts 3, 4, 5. The bistable switching system 7, similar to the corresponding system 6, controls all three electronic fluorescent lamp ballasts 3, 4 and 5, but for the electronic fluorescent ballast 3 a separate operator's control 11 (dimmer) is provided for setting the reduced brightness, but the operator's control 12 (dimmer) controls, as a group, the electronic fluorescent lamp ballasts 4, 5.

In the line R, is a circuit breaker 14 (FIG. 2) in the form of a push button, similar to the circuit breaker 13 in FIG. 1. It will be understood that the dimmers 11, 12 are similar to the dimmer 10. In a corresponding manner, the lamp ballasts 3, 4, 5 are identical with or similar to the ballast 2 and the lamps 1, in FIG. 2, are all similar to the lamp 1 of FIG. 1.

As a matter of practical utilization of the device, the various units or components may be rearranged such as, for example, incorporating the bistable switching systems 6, 7 into the electronic fluorescent lamp ballasts 2, 3, 4, 5, or into an individual one of them. Also, if desired, the operator's controls (dimmers) 10, 11, 12 can also be integrated into the electronic fluorescent lamp ballasts.

Figure 3:
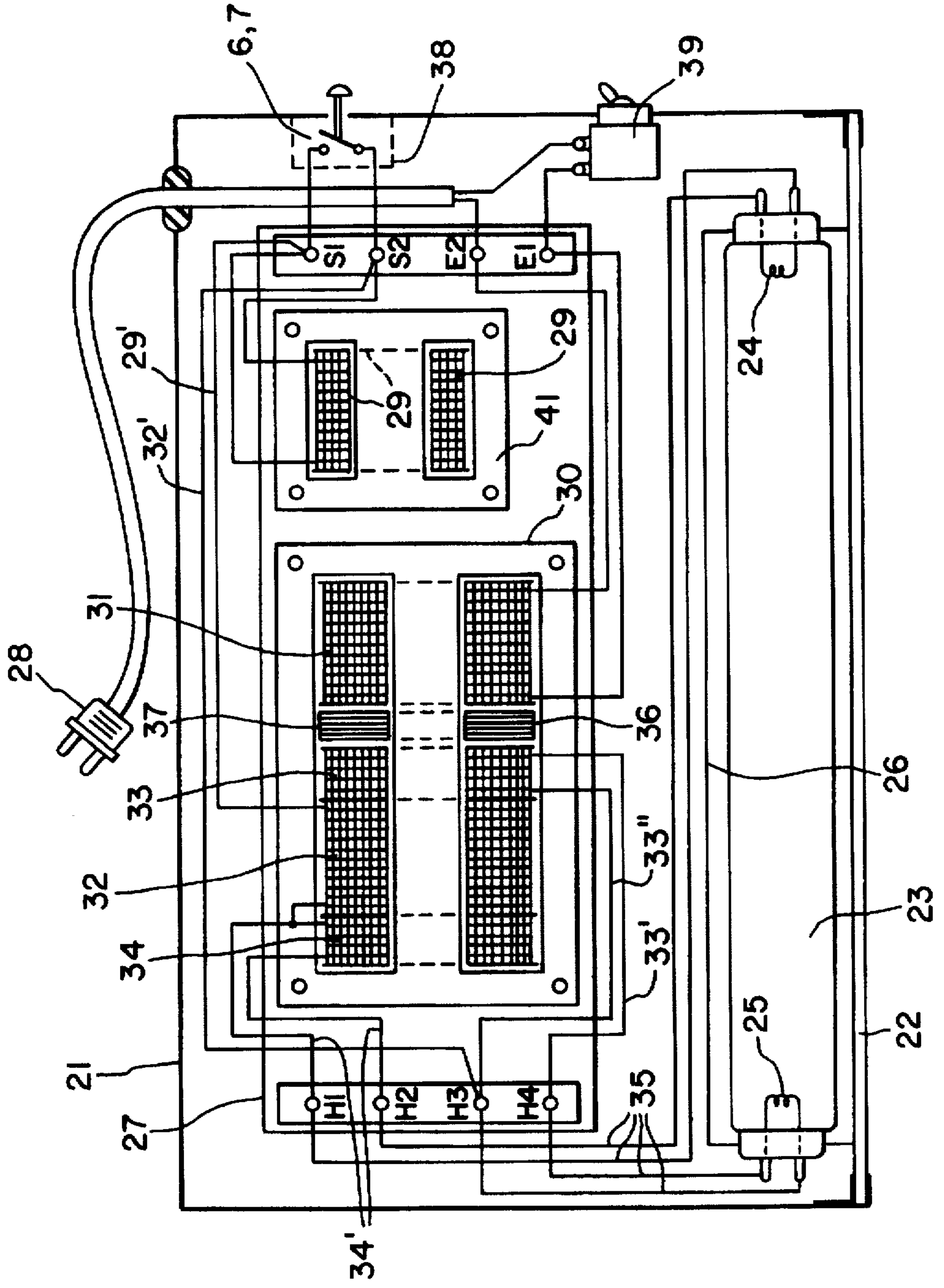
FIG. 3 is a view showing the detailed construction of an alternative embodiment of the ballast used in FIGS. 1, 2, and the lamp.
Figure 4:
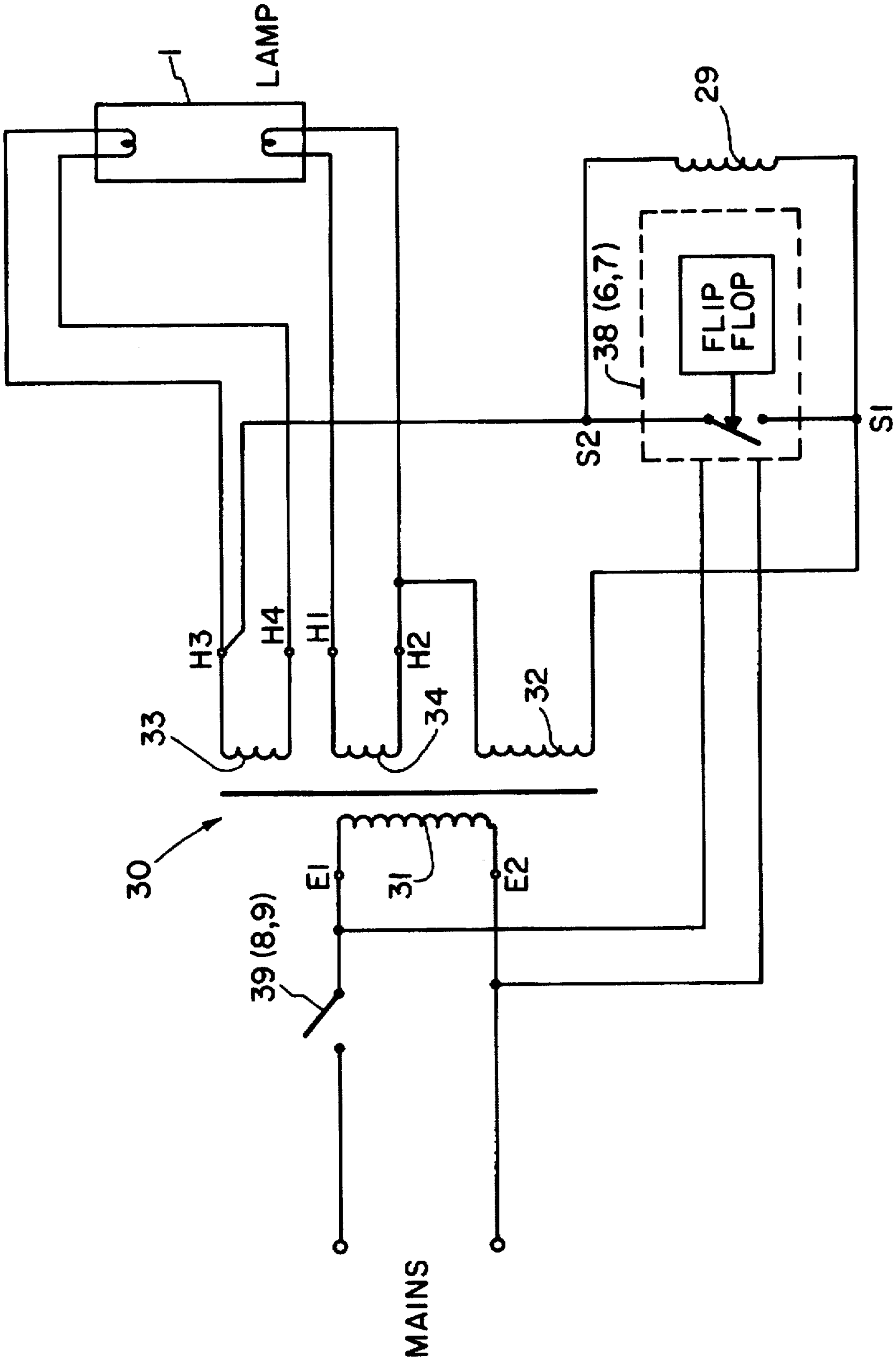
FIG. 4 is a circuit diagram of the ballast and lamp arrangement shown in FIG. 3.

FIG. 3 shows the details of the ballast utilized in FIGS. 1 and 2, and a lamp. In this case, the bistable switching system 6, 7 of FIGS. 1 and 2, is represented by the bistable switch 38. In the functioning of the switching system 6, 7, it will be understood that in any individual operation, or setting, the dimmer switch 10 will be preset at a predetermined position to provide a predetermined current value which may be a maximum of the apparatus, or any desired value less than maximum.

FIG. 3 shows a leakage or stray field transformer 30. Although the present disclosure (FIG. 3) shows one form of lamp ballast, it will be understood that the entire fluorescent lamp ballast 27 can be replaced by corresponding capacitive elements in connection with semiconductor switches. The present invention therefore is not limited to a fluorescent lamp ballast 27 with a stray field transformer 30, but may instead utilize other lamp ballasts, regardless of their individual construction.

FIG. 3 includes a lamp housing 21 having a transparent closure plate 22. A fluorescent lamp 23 has pre-heatable electrodes 24, 25 and a reflector 26. The lamp 23 is connected through the fluorescent lamp ballast 27 and a switch 39 with an electric supply line indicated by a plug 28. A choke coil 29 is active for limiting the brightness of the lamp 23.

Also, in this arrangement (FIG. 3) is the stray field transformer 30 having a primary coil 31, a secondary coil 32 for the lamp 23, and a secondary heating coil 33 in series with the coil 32. The coils of the stray field transformer 30 are arranged on a mantle core, and stray paths 36, 37 are arranged between the primary coil 31 and the secondary coils 32, 33, 34. Stray field transformers are commonly used to supply both heating and operating voltages to fluorescent lamps.

The ends of the heating coils 33, 34 are connected through conductors 33', 34' to terminal posts H1 to H4, which are connected by way of conductors 35, to the electrodes 24, 25 of the fluorescent lamp. As long as fluorescent lamp 23 has not ignited, stray field transformer 30 operates essentially like an open circuit (no operating current). A preheating voltage as measured at pre-heateable electrodes 24, 25 is at a maximum, thereby preheating fluorescent lamp 23. After lamp 23 has ignited, stray field transformer 30 supplies maximum operating current. Due to the additional current drawn from the transformer the magnetic filed in the heating coils becomes weaker. This is referred to as the stray field effect and results in a reduction in the preheating voltage. This is desirable since after ignition preheating is not necessary.

The coil 29 is appropriately constructed as a choke, indicated at 41, having a closed magnet core and conveniently housed in the fluorescent lamp ballast 27. The ends of the choke coil 41 are connected with terminal posts S1, S2. One end of the coil 29 is connected with the terminal S1 as noted, and through conductor 29' is connected with one end of the secondary coil 32, and through another conductor, 32' is connected to one end of the secondary heating coil 33. The connection between the coil 29 (41) with the other coils just referred to is completed through the bistable switch 38.

The completion of the connection through the secondary coil 33 is by way of conductor 33" and post H3 leading to the conductor 32'. The switch 38 mounted in the lamp housing is closed to bridge the coil 29 with the coils 32, 33, 34. When the connector plug 28 is inserted in a live socket, and the on/off switch 39 is activated, the lamp electrodes 24, 25 are strongly preheated. The fluorescent lamp 23 is then automatically ignited by means of the stray field transformer 30 only after considerable preheating. Thereby the duration of the preheating conforms to the respective background temperature. After the ignition of the lamp, the heating current recedes. If the lamp is used with full brightness, the heating current recedes an amount that is not detrimental to the service life of the lamp. With reduced brightness, the preheating automatically increases again, so that in light load operation the electrodes are sufficiently heated.

In the normal functioning of the device, a primary coil 31 in a transformer 30 in the ballast 27 is energized, thereby energizing a main secondary 32 for igniting the fluorescent lamp. Secondary heating coils heat the electrodes of the fluorescent tube. A choke coil opposes the main secondary coil 32, and after a momentary interruption in current supply as sensed by the bistable switching system as described above, is shunted by a bistable flip-flop switch 38. The flip-flop switch 38 is actuated by a timer switch to control the shunting of the choke coil 29 and thereby controlling the level energization of the main secondary coil 32 and consequent lighting of the lamp. In this manner, the combination of choke coil 29 and flip-flop switch 38 act as a dimmer switch such as dimmer switches 10, 11 and 12 in FIG. 1 and 2. A stray path transformer coil is included for choking the primary coil. The choke coil and bistable switch produce a maximum level and a lower level of brightness.

End of Descriptive Specifications

I claim:

1. An electronic switching apparatus to control the brightness of at least one gas discharge lamp which is connected to an electric current source via an on/off switch and an electronic ballast, said switching apparatus being interposed between the gas discharge lamp and the electric current source and comprising:

means for introducing a short interruption in the electric current source of less than one second such that the gas discharge lamp is not extinguished;

means for reducing the level of current delivered to the gas discharge lamp; and a bistable changeover system having a first and a second switching state and being sensitive to said interrupting means, whereby with the on/off switch in an on position for activating the gas discharge lamp said bistable changeover system is at said first switching state wherein the electric current is delivered to the gas discharge lamp via the ballast, upon sensing a short interruption in the electric current, as introduced by said interrupting means, said bistable changeover system changing state to said second switching state wherein a reduced level of electric current, as provided by said current reducing means, is delivered to the gas discharge lamp via the ballast, said bistable changeover system switching between said first and second switching states upon sensing each subsequent short interruption in electric current thereby effectuating brightness control over the gas discharge lamp.

2. The electronic switching apparatus of claim 1, wherein said bistable changeover system is part of the ballast.

3. The electronic switching apparatus of claim 1 wherein said means for introducing a short interruption in the electric current is a circuit breaker.

4. The electronic switching apparatus of claim 1, wherein the on/off switch is also the means for introducing a short interruption in the electric current.

5. The electronic switching apparatus of claim 1, wherein said means for reducing the level of electric current delivered to the gas discharge lamp comprises a choke coil.

6. The electronic switching apparatus of claim 5, wherein the ballast comprises a transformer having primary and secondary windings, the secondary winding being connected to the gas discharge lamp, said choke coil being shunted across the primary winding by said bistable changeover system thereby resulting in a reduced level of electric current delivered to the gas discharge lamp and a reduced level of brightness generated thereby.

7. The electronic switching apparatus of claim 6, wherein the inductive value associated with said choke coil is capable of being manipulated such that the level of reduction in the electric current is adjustable.

8. The electronic switching apparatus of claim 1, wherein said means for reducing the level of electric current delivered to the gas discharge lamp comprises a dimmer.

9. The electronic switching apparatus of claim 8, wherein the ballast comprises a transformer having primary and secondary windings, the secondary winding being connected to the gas discharge lamp, said dimmer being shunted across the primary winding by said bistable changeover system thereby resulting in a reduced level of electric current delivered to the gas discharge lamp and a reduced level of brightness generated thereby.

10. The electronic switching apparatus of claim 9, wherein said dimmer is capable of being manipulated such that the level of reduction in electric current is adjustable.

11. The electronic switching apparatus of claim 1, wherein said bistable changeover system initially is in said second switching state with the on/off switch in the on position, and changing to said first state upon sensing a short interruption in the electric current such that gas discharge lamp brightness is affected in an opposite manner.

12. The electronic switching apparatus of claim 1, wherein said bistable changeover system is capable of controlling multiple ballasts.

13. The electronic switching apparatus of claim 12, wherein said bistable changeover system is capable of controlling multiple ballasts in groups and wherein the level of reduced electric current being delivered to each gas discharge lamps is capable of being set individually or in groups by said reducing means.

14. The electronic switching apparatus of claim 12, further comprising a timer which is connected to said interrupting means whereby a short interruption may be introduced after a predetermined time interval.

15. The electronic switching apparatus of claim 1, wherein said bistable changeover system comprises a bistable flip-flop switch which is driven between said first and second switching states.

16. The electronic switching apparatus of claim 1, wherein said interrupting means produces a long interruption in electric current of more than one second, whereby said bistable changeover system is reinitialized to said first switching state.

* * * * *